United States Patent
Tondorf

(10) Patent No.: US 8,800,595 B2
(45) Date of Patent: Aug. 12, 2014

(54) HIGH-PRESSURE REGULATOR FOR COMPRESSED-AIR WEAPONS

(71) Applicant: Marco Tondorf, Bad Münstereifel (DE)

(72) Inventor: Marco Tondorf, Bad Münstereifel (DE)

(*) Notice: Subject to any disclaimer, the term of this patent is extended or adjusted under 35 U.S.C. 154(b) by 0 days.

(21) Appl. No.: 13/723,477

(22) Filed: Dec. 21, 2012

(65) Prior Publication Data

US 2013/0118610 A1    May 16, 2013

Related U.S. Application Data

(63) Continuation of application No. PCT/DE2011/001175, filed on May 20, 2011.

(30) Foreign Application Priority Data

Jun. 21, 2010   (DE) .................. 10 2010 024 493

(51) Int. Cl.
*F16K 31/12*   (2006.01)

(52) U.S. Cl.
USPC ............................. 137/505.12; 137/505.42

(58) Field of Classification Search
CPC ...... F41B 11/72; F41B 11/721; F41B 11/722; F41B 11/723; F41B 11/724; G05D 16/106; G05D 16/166
USPC ............ 124/73, 74, 75; 137/315.11, 505.12, 137/505.42, 505.3, 505.14, 599.01, 599.09, 137/601.13
See application file for complete search history.

(56) References Cited

U.S. PATENT DOCUMENTS

| | | | | |
|---|---|---|---|---|
| 4,074,694 A | * | 2/1978 | Lee | 137/505.41 |
| 5,069,111 A | | 12/1991 | Loffler et al. | |
| 6,543,475 B2 | * | 4/2003 | Colby | 137/505.25 |
| 7,520,297 B2 | * | 4/2009 | Bell et al. | 137/505.11 |
| 7,575,020 B2 | * | 8/2009 | Pechtold | 137/505.12 |
| 2003/0075219 A1 | | 4/2003 | Carroll | |
| 2006/0137745 A1 | * | 6/2006 | Carnall | 137/505.25 |
| 2006/0249132 A1 | * | 11/2006 | Gabrel | 124/70 |
| 2007/0209650 A1 | * | 9/2007 | Jones | 124/73 |
| 2009/0260610 A1 | * | 10/2009 | Walker et al. | 124/73 |

FOREIGN PATENT DOCUMENTS

| | | |
|---|---|---|
| EP | 1818749 | 8/2007 |
| WO | WO9900635 | 1/1999 |
| WO | WO2008008307 | 1/2008 |
| WO | WO2008095047 | 8/2008 |

* cited by examiner

*Primary Examiner* — Craig Schneider
*Assistant Examiner* — Jessica Cahill
(74) *Attorney, Agent, or Firm* — Smartpat PLC; Axel Nix

(57) ABSTRACT

A high pressure regulator for compressed gas weapons, and in particular for paintball markers, is situated inside a cylindrical regulator housing which is connected to a source of compressed gas. The cylindrical regulator housing comprises an inlet channel which is connected to a supply of high-pressure gas. A first regulator (H) comprises a first piston movably disposed within the regulator housing for regulating pressure in a first expansion chamber. A second regulator (D) comprises a second piston movably disposed within the regulator housing for regulating pressure in a second expansion chamber. The first piston and the second piston are arranged coaxially within the regulator housing. The high pressure regulator is suitable to be mounted in the foregrip of a paintball marker and reduce an inlet pressure of about 850 psi to a first pressure of about 250 psi and a second pressure of about 100 psi.

14 Claims, 7 Drawing Sheets

HIGH-PRESSURE REGULATOR FOR COMPRESSED-AIR WEAPONS

TECHNICAL FIELD

The present disclosure generally relates to a high pressure regulator for compressed gas weapons, and more particularly to a high pressure regulator for paintball markers situated within a cylinder that is connected to a source of pressurized gas and comprises a spring-loaded piston.

BACKGROUND

High pressure regulators are used to regulate the pressure of a compressed gas to a working pressure suitable for, e.g., paintball markers. A typical pressure regulator in the form of a piston pressure regulator is known e.g. from U.S. Pat. No. 6,543,475, which is incorporated hereby by reference thereto in its entirety. Piston pressure regulators are characterized by the fact that the pressure is regulated by means of a spring-loaded piston. A Belleville disk spring used for this purpose can usually be regulated via a screw thread (a regulator spring). The piston is sealed against the cylinder wall with at least one elastomer O-ring. Due to its thickness in combination with the O-ring, piston pressure regulators can achieve a higher working pressure than diaphragm pressure regulators.

In compressed gas weapons known from the prior art, in particular paintball markers operating with only one pressure regulator, the entire operating process to trigger the firing of a shot is dependent on the pressure set at the regulator in order to accelerate the projectile to the desired velocity. If this pressure must be regulated across a broad range, malfunctions may occur.

In order to eliminate any such malfunctions, two regulators are used in some paintball markers; the pressure for the proper functioning of the compressed gas weapon (working pressure) and the pressure for the acceleration of the projectile (chamber pressure) are separately regulated in such a system. Thus the inlet pressure of ca. 450-950 psi in the front regulator, which is usually located in front of the trigger of the compressed gas weapon and simultaneously serves as a foregrip, is first regulated to the pressure of ca. 100-230 psi needed to accelerate the projectile. In a second step, a portion of this gas is conducted away to a second regulator, which is located either as an attachment beneath the barrel or inside the compressed gas weapon, and which regulates the working pressure down to ca. 50-100 psi.

The drawbacks of using a second regulator are the increased space demanded by such an installation and the greater weight of the compressed gas weapon. The installation of the second regulator beneath the barrel obstructs the user's grasp of the weapon and negatively affects its handling. If the second regulator is installed within the housing of the compressed gas weapon, the size of the housing is increased and the weapon made more unwieldy.

SUMMARY

The present disclosure presents a high pressure regulator which can be installed in the housing of a compresses gas weapon or a paintball marker in a space-efficient manner, preferably in a foregrip. It is technically simple and simultaneously ensures that the pressure of a compressed gas is effectively reduced to the desired lower pressures by means of a single unit without a secondary pressure regulator.

The aforementioned objective is attained in accordance with the invention by the features of the independent claims. Advantageous variations of the high pressure regulator in accordance with the invention are described in the dependent claims.

A high pressure regulator for a compressed gas weapon or paintball marker comprises a cylindrical regulator housing. The regulator is connected to a supply of high-pressure gas through an inlet channel in the housing. A first regulator comprises a first piston movably disposed within the regulator housing for regulating pressure in a first expansion chamber. A second regulator comprises a second piston movably disposed within the regulator housing for regulating pressure in a second expansion chamber. The first piston and the second piston are arranged coaxially within the regulator housing.

The regulators may be configured such that
a) the second pressure regulator generates an outlet pressure from the inlet pressure, or
b) the first pressure regulator generates an outlet pressure from the outlet pressure of the second pressure regulator, or
c) the second pressure regulator generates the outlet pressure from the outlet pressure of the first pressure regulator, or
d) both pressure regulators generate their respective outlet pressures from the inlet pressure.

The inlet pressure is normally in the vicinity of up to 850 psi. The outlet pressure of the first pressure regulator is normally in the vicinity of up to 250 psi. The outlet pressure of the second pressure regulator is generally in the vicinity of up to 100 psi.

The advantages with respect to previous solutions consist in the smaller dimensions of the compressed gas weapon and its improved manageability. As the high pressure regulator simultaneously functions as the foregrip, it must be of a certain size in order to enable it to be grasped. If the first pressure regulator and the second, coaxially mounted pressure regulator are both installed in the foregrip, the marker housing can be reduced in size, and additional fittings beneath the barrel are also not necessary.

Further objectives, features, advantages, and potential applications of the high pressure regulator may be discerned from the following description of several exemplary embodiments by means of the drawings.

DETAILED DESCRIPTION

Figure 1:
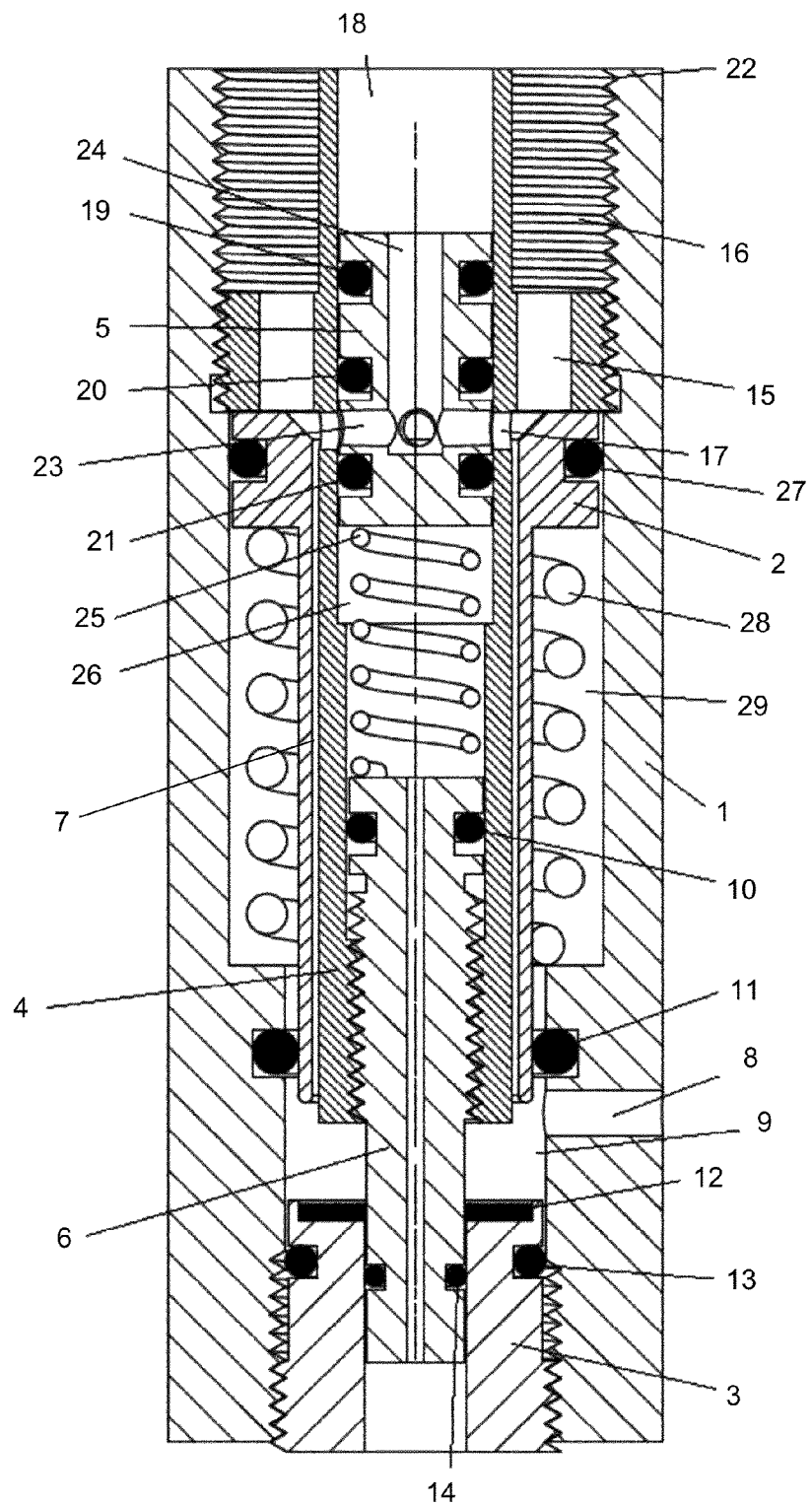
FIG. 1 depicts a high pressure regulator in a sectional view with a first piston and a second piston each in an open position.

FIG. 1 shows a preferred embodiment of a high pressure regulator. The cylindrical regulator housing 1 contains two coaxially situated pressure regulators H and D. The outlet pressure is generated by means of the inflow of the inlet pressure into the inlet chamber 9 through inlet channel 8. The inlet chamber 9 is closed when the first piston 2 is in its closed position. It extends between an inner wall of the regulator housing 1, an outer wall of the first piston 2 and an inner face of a first adjustment mechanism 3. The inlet chamber 9 is sealed by a first O-ring 11 between the inner wall of the regulator housing 1 and the outer wall of the first piston 2, a gasket 12 between the inner face of the first adjustment mechanism 3 and the first piston 2 and a second O-ring 13 between the first adjustment mechanism and the inner wall of the regulator housing 1. The inlet pressure can escape from the inlet chamber 9 through a gap between the first piston 2 and the second housing 4. From here, the inlet pressure takes two paths, as represented below:

Path 1: By means of the drilled hole 17 in the second housing 4, the inlet pressure enters the second expansion chamber 18 through the drilled bores 23, 24 in the second piston 5. The second expansion chamber 18 is formed by the O-ring 19 and the marker (not shown). The regulator housing 1 is connected to the marker by means of the threaded fitting 22, thus closing the regulator housing from above.

Pressure builds in the second expansion chamber 18, and, with increasing pressure, presses the second piston 5 downward against the resistive force of the second spring 25. The second piston 5 must only act against the pressure of the second spring 25, as the second spring chamber 26 is at normal atmospheric pressure.

The second spring chamber 26 is formed by the O-rings 10, 21. Increasing pressure in the second expansion chamber 18 pushes the second piston 5 downward against the force of the second spring 25 until the O-rings 19, 20 enclose drilled hole 17, at which point no further gas can enter the second expansion chamber 18 through the drilled horizontal bore 23.

If a shot is fired in the marker, gas from the second expansion chamber 18 is used up and pressure drops. With decreasing pressure, the force exerted on the second piston 5 also decreases. If the pressure in the second expansion chamber 18 drops to the point at which the force exerted on the second piston 5 is less than the force of the second spring 25, the second piston 5 moves in the direction of the second expansion chamber 18 until the drilled hole is enclosed by the O-rings 20, 21.

The force of the second spring 25 against the second piston 5 can be adjusted by means of the second adjustment screw 6; this permits the setting of the outlet pressure that builds up in the second expansion chamber 18.

Path 2: Gas flows into the first expansion chamber 16 via the drilled hole 15 in the second housing 4. The first expansion chamber 16 is formed by the O-ring 27 and the marker.

The drilled hole 17 is closed off by the O-rings 19, 20, as the outlet pressure generated in the second expansion chamber 18 is lower than the pressure in the first expansion chamber 16.

With increasing pressure in the first expansion chamber 16, the force exerted on the first piston 2 also increases, and thus pushes the first piston 2 against the force of the first spring 28 in the direction of the inlet chamber 9. Once the preset outlet pressure in the first expansion chamber 16 is reached, the first piston 2 presses against the gasket 12 and thus seals off the first expansion chamber 16.

The distance traveled by the first piston 2 can be adjusted by means of the first adjustment screw 3. This permits the adjustment of the outlet pressure in the first expansion chamber 16.

In a particularly advantageous embodiment of the invention, the two adjustment screws 3 and 6 are installed coaxially, and are accessible from one side, ideally from below; particularly advantageous would be for these to be adjusted from below the foregrip.

The first spring chamber 29 is at normal atmospheric pressure, so the force generated by the pressure in the first expansion chamber 16 presses only against the force of the first spring 28. The first spring chamber 29 is delimited by the O-rings 11, 27.

Figure 2:
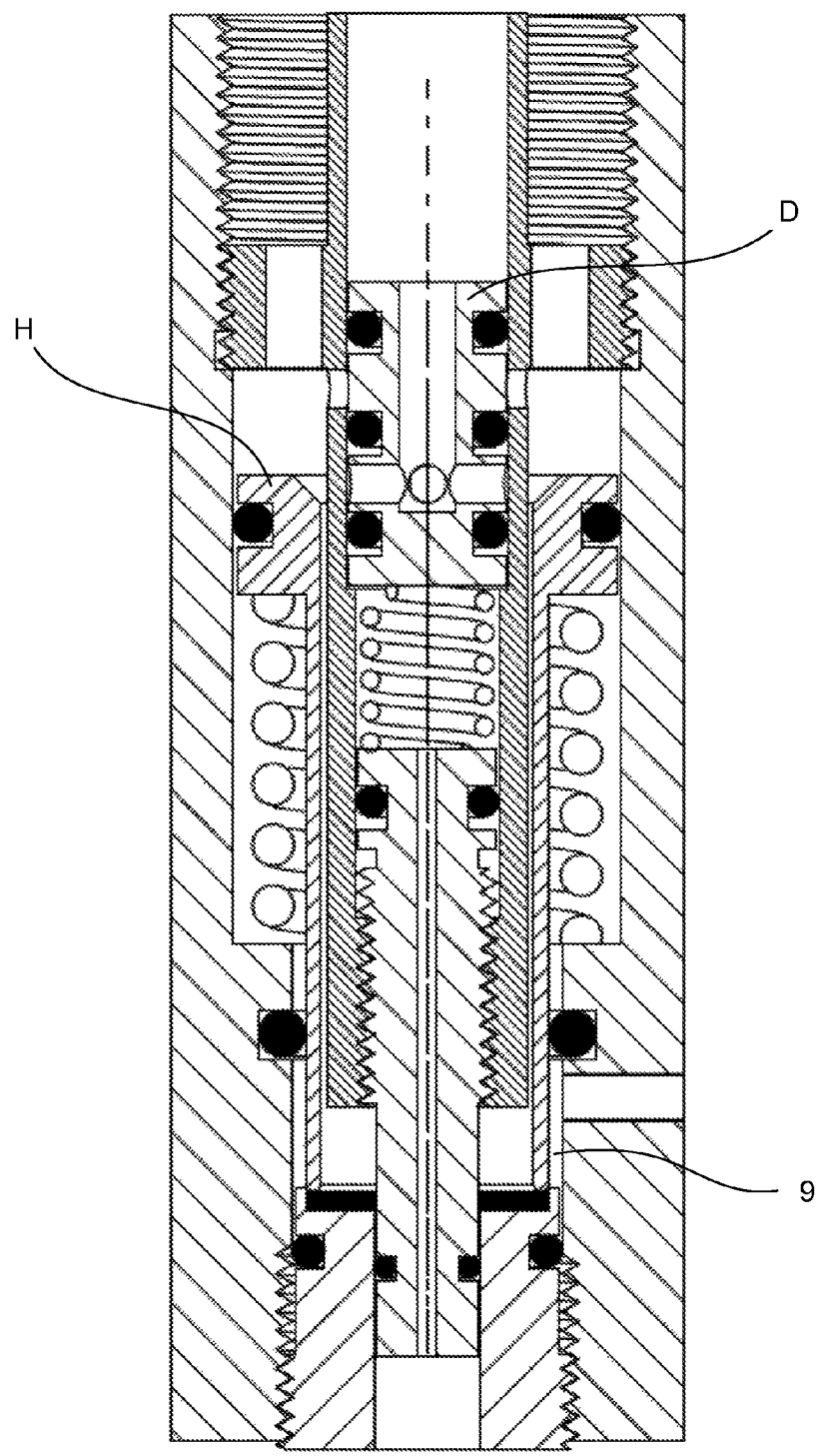
FIG. 2 depicts the high pressure regulator as in FIG. 1 with the first piston and the second piston each in a closed position.

FIG. 2 depicts the embodiment of the high pressure regulator in accordance with the invention as described above, with outlet pressure attained in the expansion chambers 16 and 18.

Figure 3:
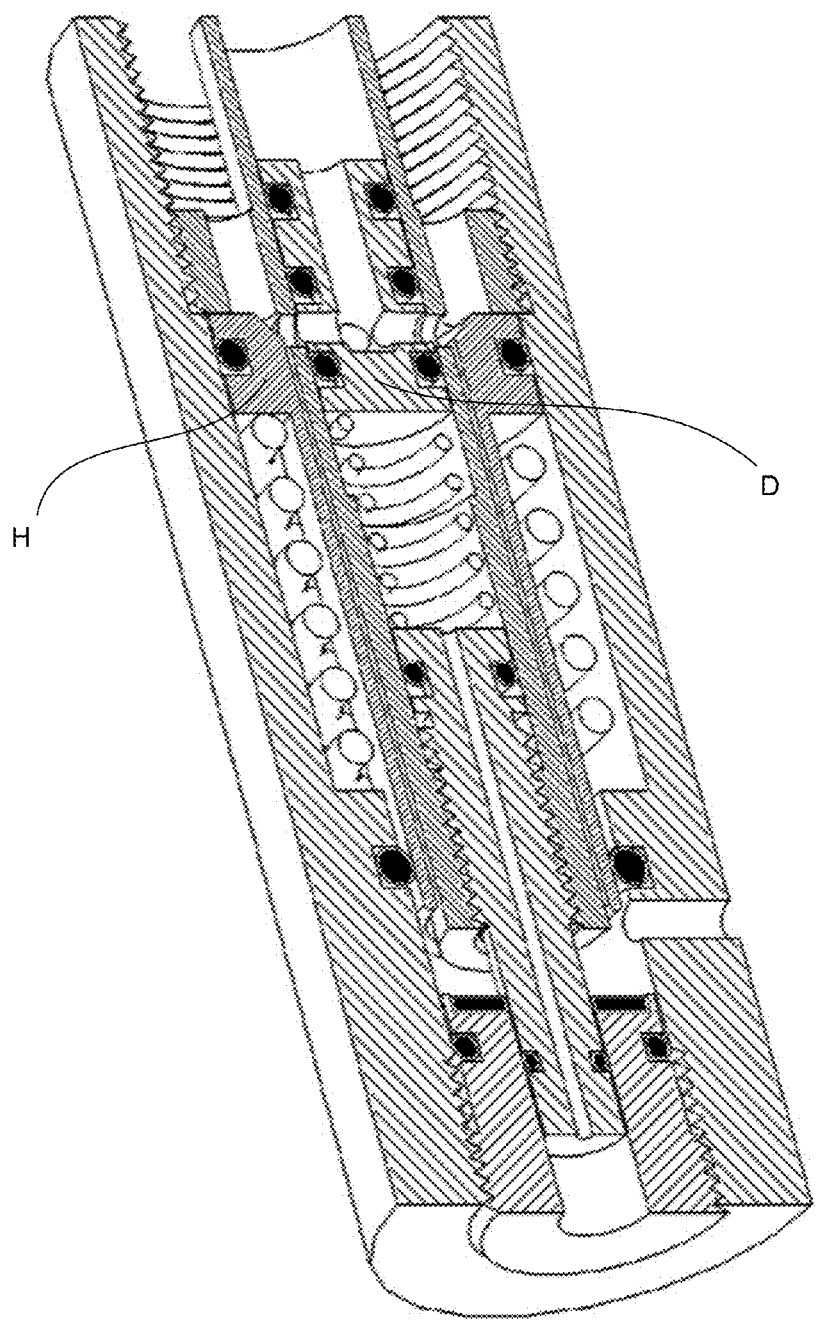
FIG. 3 depicts the high pressure regulator in perspective view.

FIG. 3 depicts a perspective view of the high pressure regulator.

Figure 4:
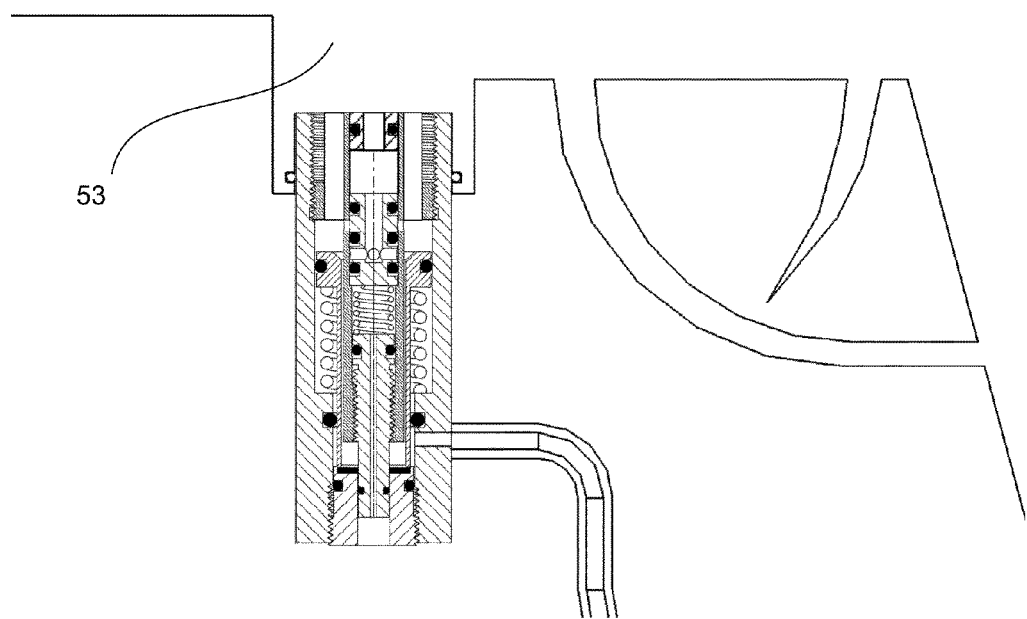
FIG. 4 depicts a partial cross-section of a paintball marker with the high pressure regulator of FIGS. 1 and 2.

FIG. 4 depicts a partial cross-section of a compressed gas weapon or paintball marker 53 with the high pressure regulator.

Figure 5:
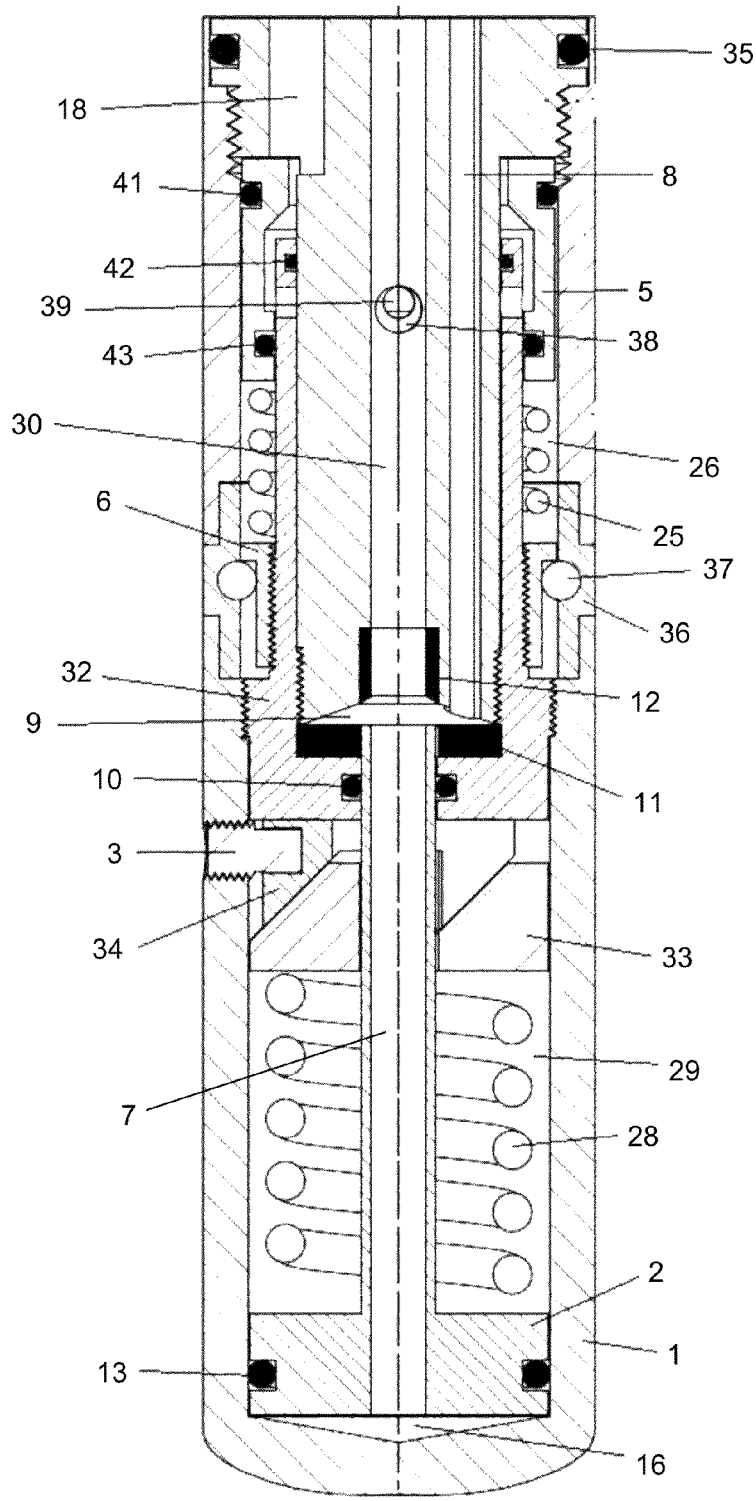
FIG. 5 depicts an alternative embodiment of a high pressure regulator in a sectional view.

FIG. 5 depicts a sectional view of an alternative high pressure regulator. As can be seen from FIG. 5, the outlet pressure of the first pressure regulator H is generated through the inflow of the inlet pressure into the inlet chamber 9 through the inlet channel 8. This inlet chamber 9 is delimited by the O-rings 10, 11 and the gasket 12, and the marker (not shown) to which gas channel 30 is connected, and enters into the first expansion chamber 16 via the first piston 2. With increasing pressure in the first expansion chamber 16, the force pushes the first piston 2 against the resistance of the first spring 28 in the direction of the gasket 12, until the first piston 2 is pressed against the gasket 12 and thus closes off the first expansion chamber 16.

When a shot is fired in the marker, the pressure in the first expansion chamber 16 decreases until the force of the first spring 28 is greater than the force of the gas pressure, and the first piston 2 is thus once again pushed away from the gasket 12.

The force exerted by the first spring 28 on the first piston 2 can be adjusted by means of the preferably intended first adjustment mechanism 3, 33, 34. This permits the outlet pressure that builds up in the first expansion chamber 16 to be adjusted. If the first adjustment screw 3 is screwed into the regulator housing 1, the slide 34 moves in the same direction. This forces the spring washer 33 in the direction of the first spring 28, by means of which the force of the first spring 28 on the first piston 2 can be adjusted.

The outlet pressure of the first regulator is maintained in the gas channel 30. By means of the drilled holes 38, 39, the outlet pressure of the first pressure regulator H enters into the second expansion chamber 18 of the second pressure regulator D. The second expansion chamber 18 is delimited by the O-rings 35, 41, 42, and 43 and by the marker connected to the second expansion chamber 18. As the pressure increases in the second expansion chamber 18, the force presses the second piston 5 against the force of the second spring 25 in the direction of the connecting element 32, until the second piston 5 is pushed against the edge of the connecting element 32. The second piston 5 consists of suitable material (e.g. plastic) and acts as a seal when the second piston 5 is pushed against the connecting element 32.

When a shot is fired in the marker, the pressure in the second expansion chamber 18 decreases until the force of the second spring 25 is greater than the force of the gas pressure, and the second piston 5 is thus once again pushed away from the connecting element 32.

Figure 6A:
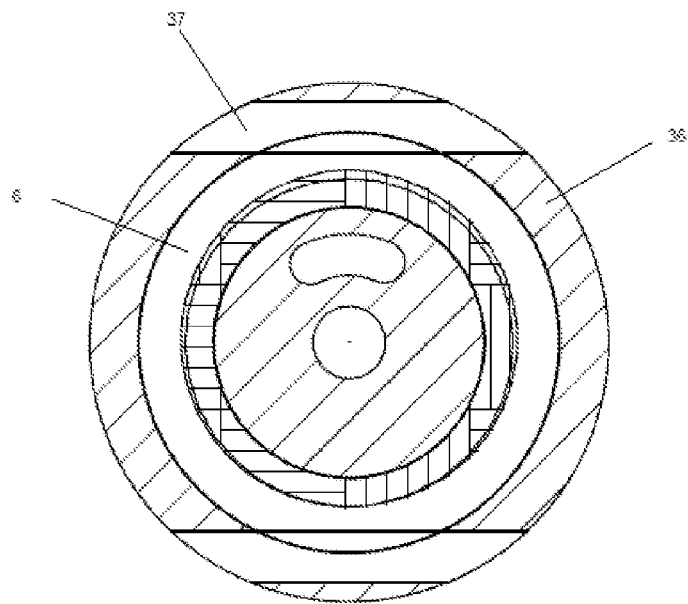
FIGS. 6a and 6b show a horizontal cross section through the second adjustment system of the high pressure regulator of FIG. 5 in two alternative positions.
Figure 6B:
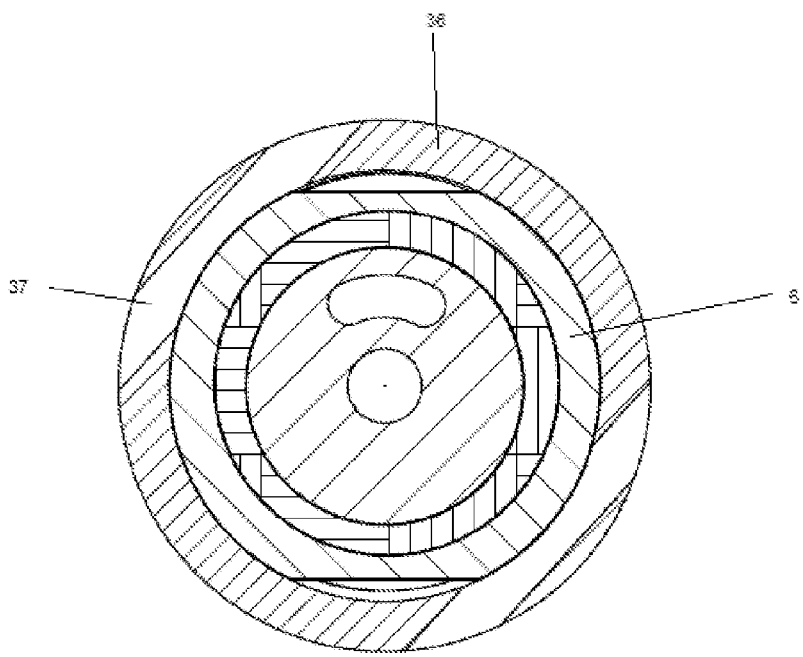

By means of the advantageous second adjustment mechanism 6, 36 represented in FIGS. 6a, 6b, the force of the second spring 25 on the second piston 5 can be adjusted. The outlet pressure that builds up in the second expansion chamber 18 may thus be adjusted.

The screw covering 36 can be freely rotated without causing the second screw 6 to turn (FIG. 6a). It must be rotated in such a way that a tool can be inserted through the drilled hole 37 in order to turn the second screw 6 (FIG. 6b).

Figure 7:
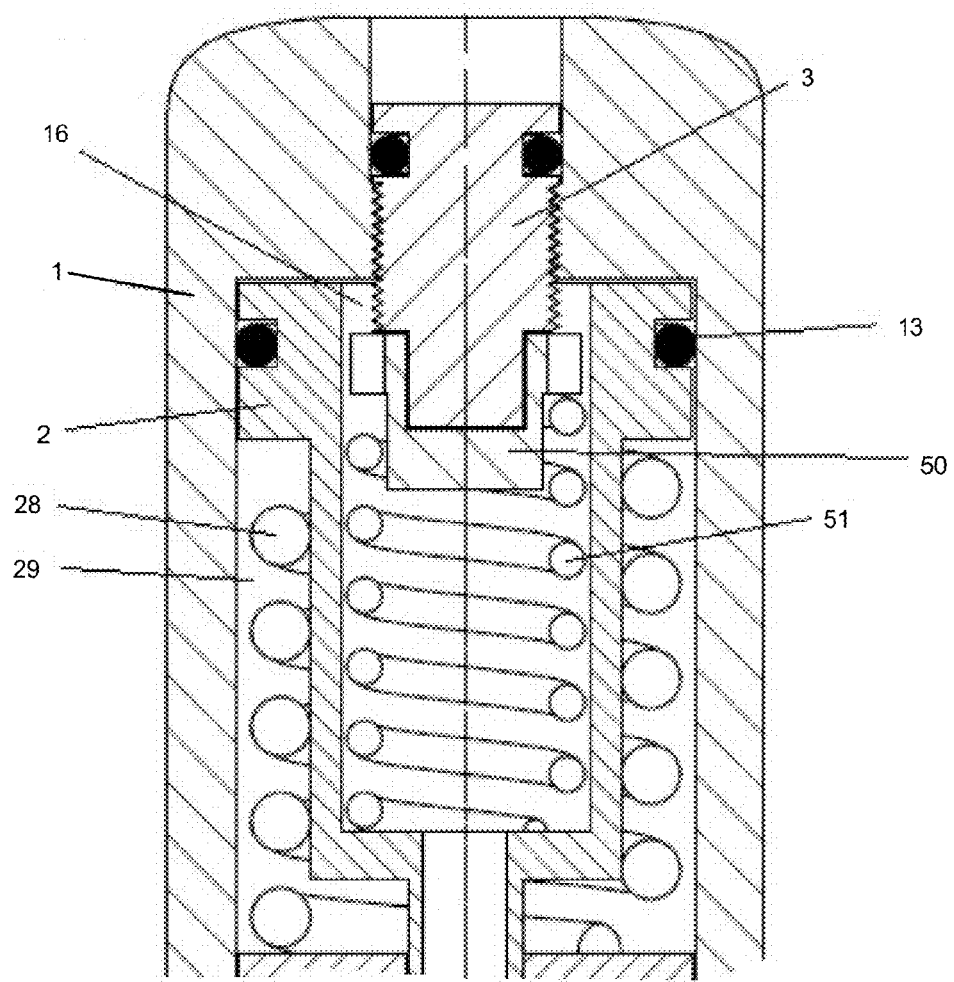
FIG. 7 depicts a partial cross-section of a further embodiment of a high pressure regulator.

As can be seen from FIG. 7, the adjustment mechanism 3, 50 of the high pressure regulator in accordance with the invention can be realized in such a way that an first adjustment screw 3 pushes against a spring washer 50, which in turn presses against a spring 51. In this way, the force of the spring 51, which is counteracting the force of the first spring 28, can be adjusted. By this means, the pressure in the first expansion chamber 16 can be adjusted. In addition to the aforementioned O-rings, the first expansion chamber 16 is sealed with an O-ring 52.

In one advantageous embodiment, the first piston 2 comprises a first piston bore 7 and the second piston 5 comprise a second piston bore 23, 24 such that the second piston 5 is at least partially disposed within the first piston bore 7.

While the present invention has been described with reference to exemplary embodiments, it will be readily apparent to those skilled in the art that the invention is not limited to the disclosed or illustrated embodiments but, on the contrary, is intended to cover numerous other modifications, substitutions, variations and broad equivalent arrangements that are included within the spirit and scope of the following claims.

What is claimed is:

1. A high pressure regulator for a compressed gas weapon or paintball marker, comprising:
    a cylindrical regulator housing (1) comprising an inlet channel (8) connected to a supply of high-pressure gas;
    a first regulator (H) comprising a first piston (2) movably disposed within the regulator housing (1) for regulating pressure in a first expansion chamber (16);
    a first spring (28) disposed in a first spring chamber (29) contacting the first piston (2) opposite the first expansion chamber (16):
    a first gas channel extending between the inlet channel (8) and the first expansion chamber (16) when the first piston is in an open position;
    a first adjustment mechanism (3) for adjusting the pressure in the first expansion chamber (16); and
    a second regulator (D) comprising a second piston (5) movably disposed within the regulator housing (1) for regulating pressure in a second expansion chamber (18),
    wherein the first piston (2) and the second piston (5) are arranged coaxially within the regulator housing (1), and
    wherein the first adjustment mechanism (3) is adjustably positioned within the regulator housing (1) and comprises a gasket (12) disposed on an inner face of the first adjustment mechanism (3), the gasket being in contact with the first piston (2) when the first piston (2) is in its closed position and
    wherein the first adjustment mechanism (3) is formed as a hollow cylinder having a threaded outer wall that engages a corresponding threaded inside wall of the regulator housing (1), allowing the position of the first adjustment mechanism to be varied within the regulator housing (1) such that a force required to push the first piston (2) against the first spring (28) into the gasket (12) on the inner face of the first adjustment mechanism (3) is adjustable.

2. The high pressure regulator as in claim 1, wherein the first spring (28) pushes the first piston (2) into an open position when the pressure in the first expansion chamber (16) is below a predetermined first pressure threshold, causing gas to flow through the first gas channel from the inlet channel (8) into the first expansion chamber (16).

3. The high pressure regulator as in claim 1, wherein pressure force of compressed gas in the first expansion chamber (16) pushes the first piston (2) against the first spring (28) into a closed position when the pressure in the first expansion chamber (16) is above a predetermined first pressure threshold, causing the first gas channel between the inlet channel (8) and the first expansion chamber (16) to be closed.

4. The high pressure regulator as in claim 1, further comprising
    an inlet chamber (9) connected to the inlet channel (8), the inlet chamber (9) being formed when the first piston (2) is in its closed position and extending between an inner wall of the regulator housing (1), an outer wall of the first piston (2) and an inner face of a first adjustment mechanism (3),
    the inlet chamber (9) being sealed by
        a first O-ring (11) between the inner wall of the regulator housing (1) and the outer wall of the first piston (2),
        a gasket (12) between the inner face of the first adjustment mechanism (3) and the first piston (2) and
        a second O-ring (13) between the first adjustment mechanism and the inner wall of the regulator housing (1).

5. The high pressure regulator as in claim 1, wherein
    the first piston (2) is hollow and comprises a first piston bore (7) through which gas flows from the inlet channel (8) to the first expansion chamber (16) when the first piston (2) is in its open position.

6. A high pressure regulator for a compressed gas weapon or paintball marker, comprising:
    a cylindrical regulator housing (1) comprising an inlet channel (8) connected to a supply of high-pressure gas;
    a first regulator (H) comprising a first piston (2) movably disposed within the regulator housing (1) for regulating pressure in a first expansion chamber (16);
    a second regulator (D) comprising a second piston (5) movably disposed within the regulator housing (1) for regulating pressure in a second expansion chamber (18);
    a second housing (4) attached to the regulator housing (1), and enclosing the second piston (5);
    a second adjustment mechanism (6) adjustably connected to the second housing (4);
    a second spring (25) arranged in a second spring chamber (26) between the second piston (5) and the second adjustment mechanism (6), the second spring (25) pushing the second piston (5) into an open position when the pressure in the second expansion chamber (18) is below a predetermined second pressure threshold; and
    a second gas channel extending between the first expansion chamber (16) and the second expansion chamber (18) when the second piston (5) is in the open position,
    wherein the second piston (5) is movably disposed within the second housing (4) between a closed position and an open position,
    and wherein the second piston (5) is partially hollow, comprising a horizontal bore (23) and a vertical bore (24), the vertical bore (24) extending from a top of the second piston to the horizontal bore (23),
    and wherein the first piston (2) and the second piston (5) are arranged coaxially within the regulator housing (1).

7. The high pressure regulator as in claim 6, wherein gas flows from the first expansion chamber (16) through a hole (17) in the second housing (4) into the horizontal bore (23)

and the vertical bore (24) of the second piston (5) into a second expansion chamber (18) when the second piston (5) is in its open position.

8. The high pressure regulator as in claim 6, wherein the second expansion chamber (18) extends between the second piston (5), the second housing (4) and the compressed gas weapon or paintball marker, and wherein the second expansion chamber (18) is sealed by a third O-ring (19) between the second piston (5) and an inner wall of the second housing (4).

9. The high pressure regulator as in claim 6, wherein increasing pressure in the second expansion chamber (18) causes the second piston (5) to move against the second spring (25) into a closed position in which a hole (17) in the second housing (4) is blocked by the second piston (5), preventing a flow of gas from the first expansion chamber (16) to the second expansion chamber (18).

10. The high pressure regulator as in claim 6, further comprising a third O-ring (19) and a fourth O-ring (20) between the second piston (5) and the second housing (4), wherein the third O-ring (19) is located above and the fourth O-ring (20) is located below a hole (17) in the second housing (4) when the second piston is in its closed position.

11. The high pressure regulator as in claim 6, further comprising a fourth O-ring (20) and a fifth O-ring (21) between the second piston (5) and the second housing (4), wherein the fourth O-ring (20) is located above and the fifth O-ring (21) is located below a hole (17) in the second housing (4) when the second piston is in its open position.

12. The high pressure regulator as in claim 6, wherein a reduction of pressure in the second expansion chamber (18) causes the second spring (25) to push the second piston (5) into an open position in which a hole (17) in the second housing (4) is aligned with the horizontal bore (23) in the second piston (5), allowing gas to flow from the first expansion chamber (16) to the second expansion chamber (18).

13. The high pressure regulator as in claim 6, further comprising an gas channel (61) in the adjustment mechanism (6), the gas channel (61) connecting the second spring chamber (26) with the outside of the high pressure regulator such that gas can enter and escape the second spring chamber (26), causing the second spring chamber (26) to maintain surrounding atmospheric pressure.

14. The high pressure regulator as in claim 13, wherein the second spring chamber (26) is sealed in the second housing (4) by a fifth O-ring (21) between the second piston (5) and the second housing (4) and a sixth O-ring (10) between the second adjustment mechanism (4) and the second housing (4).

* * * * *